United States Patent [19]

Fong

[11] Patent Number: 4,680,339
[45] Date of Patent: Jul. 14, 1987

[54] CARBOXYLATE CONTAINING MODIFIED ACRYLAMIDE POLYMERS

[75] Inventor: Dodd W. Fong, Naperville, Ill.

[73] Assignee: Nalco Chemical Company, Oak Brook, Ill.

[21] Appl. No.: 831,964

[22] Filed: Feb. 24, 1986

[51] Int. Cl.$^4$ ............................. C08F 8/40; C08F 8/32
[52] U.S. Cl. .............................. 525/54.11; 525/329.4; 525/340; 525/341; 525/438; 525/351; 525/379; 525/380
[58] Field of Search ............... 525/340, 341, 348, 351, 525/379, 380, 54.11

[56] References Cited

U.S. PATENT DOCUMENTS

| | | | |
|---|---|---|---|
| 3,776,976 | 12/1973 | Volker et al. | 525/379 |
| 4,097,420 | 6/1978 | Mikes et al. | 525/329.4 |
| 4,251,410 | 2/1981 | Danner et al. | 525/379 |
| 4,273,897 | 6/1981 | Onizawa | 525/379 |
| 4,330,440 | 5/1982 | Ayers et al. | 525/259 |
| 4,390,659 | 6/1983 | Stanley, Jr. et al. | 525/379 |

*Primary Examiner*—Joseph L. Schofer
*Assistant Examiner*—Bernard Lipman
*Attorney, Agent, or Firm*—John G. Premo; Donald G. Epple; Anthony L. Cupoli

[57] ABSTRACT

A high temperature, pressurized process is described to synthesize substituted carboxylated modified acrylamide polymers represented by the structure:

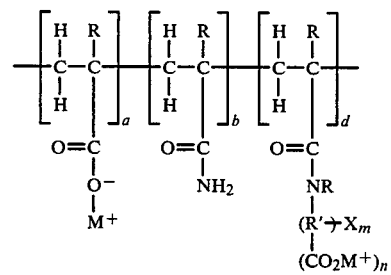

wherein X is from the group $-SO_3M$, $-PO_3M_2$, $-COOR$, $-OR$,

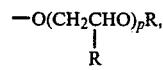

and mixtures thereof.

8 Claims, No Drawings

CARBOXYLATE CONTAINING MODIFIED ACRYLAMIDE POLYMERS

INTRODUCTION

Water-soluble polymers are available through various procedures, including condensation polymerization, vinyl polymerization using various free radical catalysts or other catalytic or initiation devices, and even chemical modification of existing polymers by subsequent chemical reaction, such as hydrolysis of pendant amide functional groups to carboxylic acid groups. Chemical modification of existing polymers to achieve water solubility can however lead to other difficulties such as loss of molecular weight and unwanted changes in molecular weight distribution or even cross-linking and possible loss of water solubility. It would therefore be an advance in the art if other water-soluble polymeric chemical structures could be synthesized on a polymeric backbone which structures would contain the carboxylate functional groups, either in the acid or base form, and which structures might also contain multiple and various functional groups which could enhance the use of these water-soluble polymers in certain applications such as dispersants in water treatment, scale inhibitors in natural and industrial waters, flocculants and coagulants, and the like.

It is therefore an object of this invention to create water-soluble polymers containing various functional groups and, in addition, which polymers may also contain multiple functional groups which may be useful when applied to aqueous solutions or environments.

It is another object of this invention to develop a synthetic procedure which can generally be applicable to the synthesis of various types of water-soluble polymers containing the various functional groups with or without the additional presence of other functional groups which may be useful when these polymers are added to aqueous systems.

It is another object of this invention to synthesize and recover certain types of carboxylate containing water-soluble polymers which polymers may contain other functional groups such as sulfonate, ether, alkoxyl, ester groups, and/or mixtures thereof, which polymers have not heretofore been known or used.

THE INVENTION

I have discovered a process for modifying water-soluble polymers containing pendant amide functional groups, such polymers primarily derived from acrylamide containing vinylic polymers/copolymers or from alkyl substituted acrylamide containing vinylic polymers or copolymers, and which polymers/copolymers are water soluble and contain pendant amide functional groups derived from acrylamide, methyl acrylamide, ethylacrylamide, and the like.

The process which I have discovered is a process that uses the equivalent of a transamidation reaction with the pendant amide group on the polymer and a chemical reactant represented by the structure:

Formula I.

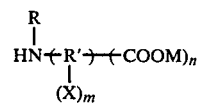

wherein
R is individually chosen, in each occurrence, from the group consisting of hydrogen and lower alkyl groups containing from 1–4 carbon atoms;
M is chosen from the group consisting of hydrogen, lower alkyl ($C_1$–$C_4$) groups, alkali metals, alkaline earth metals, protonated amines, quaternary ammonium and ammonium ions, and mixtures thereof;
R' is a multi-valent hydrocarbonaceous bridging group which may be linear, branched, cyclic, aromatic, heterocyclic, and mixtures thereof, and having from 1–16 carbon atoms;
X is chosen from —$SO_3M$, —OR,

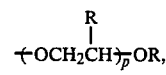

—$NR''_3$, —$NR''_4$ and mixtures thereof, and
R'' is chosen from

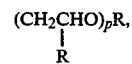

R—R'—$NR''_3$, —$R'NR''_3$, —$PO_3M_2$
and mixtures thereof:
and wherein,
p ranges from 1–16
m ranges between 0 and 16,
n ranges between 1 and 16, provided that the sum of m+n is between 1–20.

THE CHEMICAL REACTANT

The chemical reactant described above is primarily a primary or secondary amino substituted compound which also contains the carboxylate functional group in either the free acid form, an ester form, a salt form, or any combination thereof, and wherein the amine functional group contains at least one active hydrogen substituted on the amino nitrogen. Although carboxylate compounds having both primary and secondary amines can react under my transamidation reaction conditions to achieve modified carboxylate containing polymers, it is preferable that when a secondary amine is chosen to accomplish this modification of pendant amide containing polymers, that the alkyl group substituted on the amino nitrogen contain no more than 4 carbon atoms, i.e. the alkyl substitution should be limited to methyl, ethyl, propyl and butyl functionality, or isomers thereof.

However, it is most preferred that the amine substitution on the carboxylate containing chemical reactant be a primary amino functional group. When a primary amino functional group is used to accomplish the transamidation reaction, the reaction easily proceeds so as to incorporate at least 2, and preferably at least 60, mole percent of the chemical reactant used into the water-soluble polymer chain containing pendent amide groups.

In addition to the amine substitution in the chemical reactant described above, this chemical reactant does contain at least one carboxylate functional group in either its ester form, acid form or its salt form, wherein the salt form is chosen from a salt of an alkali metal, an alkaline earth metal, primary, secondary or tertiary amines, quaternary amines and ammonium ions, and mixtures thereof. The salt form may be in existence prior to the transamidation reaction or it may be synthesized by varying pH with bases containing alkali metals, alkaline earth metals, tertiary amines, quaternary amine bases, or ammonia, either prior to, during the transamidation reaction or after the transamidation reaction has been completed.

In addition to the carboxylate functional group and the amine functional group, the chemical reactant may also contain other functional groups chosen from the groups consisting of sulfonate, phosphonate, alkaholic, ether, ester, alkoxyl groups, tertiary amino, quaternary amino groups, and mixtures thereof. Preferably, the chemical reactant is limited to contain a primary amino group responsible for the transamidation reaction, at least one carboxylate group which allows the formation of an anionic carboxylate containing water-soluble polymer, and a sulfonate, phosphonate group or an alkoxyl functional group, the presence of which may enhance the activity of water-soluble carboxylate containing polymers synthesized by my process.

Most preferably, the chemical reactant contains a primary amine, one or more carboxyl groups, and one or more carboxylate groups either in the free acid form, salt form, or mixtures of the free acid and salt forms.

Several preferred species of the chemical reactant described above are demonstrated in the following formulations:

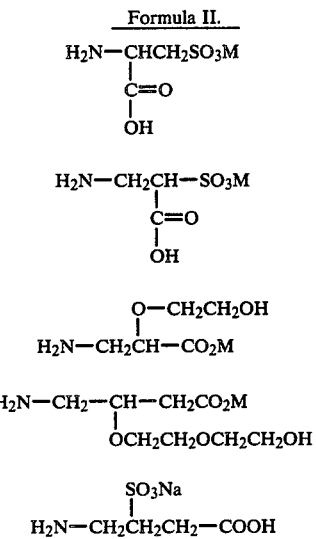

THE PENDANT ACRYLAMIDE CONTAINING POLYMERS

The pendant acrylamide containing polymers are water-soluble polymers which have a general structure allowing the presence of a pendant amide group as demonstrated in Formula III:

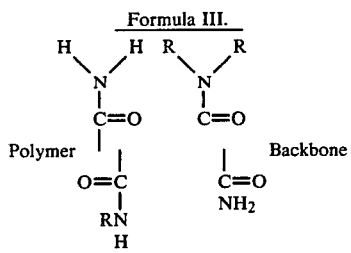

In Formula III, as one can observe, the pendant amide group may be a primary amide, a secondary amide, or a tertiary amide compound or mixtures thereof. Preferably, to obtain reasonable conversions of these pendant amide groups to the carboxylate containing functional groups described above, the pendant amide group is a primary amide group.

The most likely water-soluble polymers containing pendant amide functionality which polymers are easily modified under the conditions of my transamidation reaction, are those water-soluble polymers described by Formula IV:

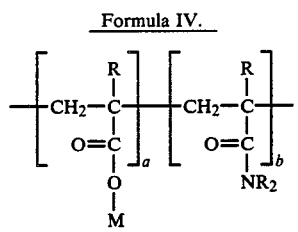

where the monomer block units of a and b are randomly distributed within the polymer chain.

R is independently chosen, at each occurrence, from the group consisting of hydrogen, and lower alkyl groups containing from 1–4 carbon atoms;

M is independently chosen, at each occurrence, from hydrogen, lower alkyl ($C_1$–$C_4$) groups, alkali metals, alkaline earth metal and, amine salts, quaternary ammonium ions, ammonium ions and mixtures thereof;

and a and b are integers having the following relationships:

a/b ranges between 0 to 100, and a+b is sufficient so as to provide a polymer having a molecular weight of at least 500. Preferably the sum, a+b, is sufficient to provide a molecular weight ranging between about 1,000–20,000,000.

As can be seen, the polymers described above may be homopolymers or copolymers of acrylamide or its alkylated homologs, i.e. methacrylamide and the like, or they may be copolymers of acrylamide and its homologs specifically with acrylic acid or its homologs such as methacrylic acid and the like, or they may be terpolymers and above with other vinylic monomers which terpolymers and above contain acrylamide or its amide homologs with acrylic acid, and their various homologs such as methacrylic acid, methacrylamide, and the like, and other additional vinylic monomers such as ethyl acrylate, methylacrylate, ethylene, propylene, vinyl sulfonate, and the like.

THE CHEMICAL REACTION

The chemical reaction which is preferred to obtain the carboxylated polymers of this invention is a reaction which can generally be referred to as a transamidation reaction. This reaction substitutes an amine compound which may also contain other functional groups such as the carboxylate function group for the nitrogen portion of a pendant amide group contained on a polymeric backbone as described above. This transamidation reaction has been discovered to be a general reaction which can achieve the substitution of my amine and carboxylate containing reactant moiety for the amide nitrogen group of the pendant amide functionality of a water-soluble polymer, thereby obtaining unique carboxylated polymers.

The reaction conditions require that polymers containing pendant amide groups be dissolved or readily dispersed in a solvent which is a common solvent for the chemical reactant of the class described above. In other words, both the polymer which is to be modified and the chemical reactant should be soluble or dispersible in the same solvent system.

Common solvents which have been found useful in this reaction include, but are not limited to, water, diglyme, dimethylformamide, dimethylsulfoxide, admixtures thereof, and admixtures of these solvents, either singly or taken together with other miscible solvents such as ethanol, tertiary butanol, glyme, and the like.

A preferred solvent which is a common solvent for both the polymer containing pendant amide groups and the chemical reactants above is water, particularly if the polymer containing pendant amide group is initially water-soluble, as in the case of most acrylamide containing vinylic polymers. Another preferred common solvent for my reaction is a water-in-oil emulsion wherein the dispersed water phase contains dissolved therein both the polymers containing pendant amide groups and the chemical reactants described above.

After having dissolved the polymers containing pendant amide groups in the common solvent, preferably water, the chemical reactant can be added to obtain a solution or dispersion of amide containing polymer and the chemical reactants of this invention. Whether the polymer or the reactant is first added to the common solvent is of no consequence. This admixture is then added to or contained in a reaction vessel capable of withstanding a pressurized chemical reaction, for example, a Paar Bomb type of vessel. The vessel is enclosed and then heated to a temperature of at least 100° C., preferably at least 110° C., and most preferably to a temperature of at least 120° C. If the temperature is increased above 100° C., the vessel contents can expand and the pressure within the vessel can exceed one atmosphere and depending upon the solvent, the carboxylate substituted reactants used and/or the reactants used, can reach up to about 5 to 15 atmospheres, and possibly more. The pressure within the reaction vessel is a non-controlled variable and is controlled only to the extent that the vessel is enclosed, that a reaction temperature of at least 100° C. or higher is reached, and the vessel may contain solvents or reactants of more or less volatile nature, which solvents and reactants have vapor pressures of such a nature that pressure vessels are required at temperatures above 100° C.

Once the reaction vessel contents have reached at least 100° C., and preferably 110° C., the reaction is allowed to occur for at least 3 minutes at this temperature, and preferably for whatever length of time is necessary to accomplish a minimum of at least a 2 percent conversion, and preferably at least from 25–60 percent conversion, of the added amount of chemical reactant.

The chemical reactant is, of course, converted to a pendant carboxylate containing substituted amide, or the product of the transamidation chemical reaction summarized above.

If the polymer is a homopolymer of acrylamide, methacrylamide, or a copolymer of vinyl amide containing monomers such that no other pendant functional group is present besides amide functional groups, the condition of the reaction is such that at least some degree of amide hydrolysis may also occur in those reactions in which water or a water containing solvent is utilized. In such cases, a carboxylate functional group may also be obtained in addition to the carboxylate modified amide and any unreacted starting amide groups from the starting polymer. This is particularly true at very high pH, so it is advisable to operate the reactions in aqueous common solvents or in water-in-oil emulsion at initial pH of below 9.0, and preferably below 8.0.

Therefore, I have described the chemical reaction or process that accomplishes the synthesis of polymers with randomly distributed monomer units having the structure:

Formula V

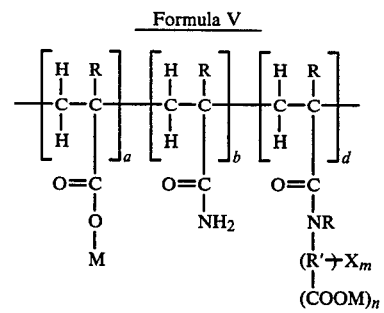

wherein
M is chosen from hydrogen, a lower alkyl ($C_1$–$C_4$) group, alkali metal, alkaline earth metal, primary, secondary or tertiary amine salts, quaternary amines and ammonium ions and mixtures thereof;
R' is a multi-covalent hydrocarbonaceous bridging group having from one to sixteen carbon atoms and being chosen from linear, branched, cyclic, aromatic and heterocyclic (functional groups), and mixtures thereof;
X is chosen from —$SO_3M$, —$PO_3M_2$, —COOR, —OR, —R'NR''$_2$, —R'NR''$_3$,

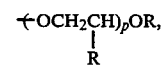

and mixtures thereof;
where R'' is

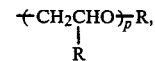

R, and mixtures thereof;
R is individually chosen at each occurrence from H and lower alkyl ($C_1$–$C_4$) groups;
and wherein
a, b, and d are integers with the following relationships;
a/b is from zero to 100
b/d is from 0.01 to 100 a/d is from zero to 100, and the sum of a+b+d is sufficient to provide a molecular weight of at least 1000, and the ratio of d:(a+b) is from 20:1 to 1:100;

and wherein p ranges between 1 and 16, and m ranges between 0 and 16, and n ranges between 1 and 16, provided that, the sum of m+n is between 1-20;

which process comprises reacting, in a common solvent, at a temperature of at least 100° C.:

A. a polymer having a molecular weight of at least 500, and having pendant amide functional groups, which polymer is represented by the structure:

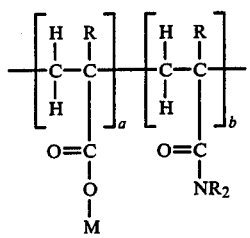

wherein R, M, a, b have the same meanings as above; with,

B. a chemical reactant having the structure:

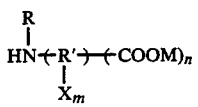

wherein R, R', M, X, m, and n have the meanings above; wherein the mole ratio of chemical reactant to pendant amide groups ranges between about 5:1 to about 1:100; and the reaction occurs for an effective amount of time to accomplish at least a 2 mole percent, and preferably from 25-60 mole percent conversion of chemical reactant to water-soluble carboxylated polymer; and then recovering the water-soluble carboxylated polymer.

Polymer recovery may be accomplished in several ways known to the person familiar with the art. For example, the polymers may be precipitated by addition of precipitating solvents, or non-solvents, to the reaction mixture. For example, methanol or acetone may be added to the reaction mixture either as is or after concentration by distillation or vacuum distillation to precipitate the polymers. The polymers may also be recovered by vacuum distillation of solvent and unreacted chemical reactant from the reaction product mixture. The polymers may also be recovered by gel permeation chromatographic techniques, however, for the most part the polymers are recovered simply as a solution in the common solvent used to perform the transamidation reaction, and used as such.

Preferably, my process is a method to synthesize water-soluble carboxylated polymers having randomly repeated mer units represented by the formula:

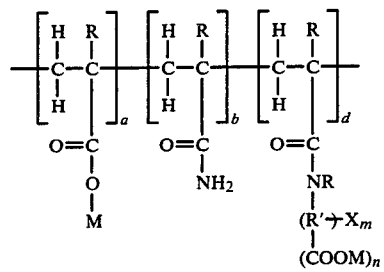

wherein

M is chosen from hydrogen, alkali metal, alkaline earth metal, tertiary amine salts, quaternary amines and ammonium ions and mixtures thereof;

R' is a multi-covalent hydrocarbonaceous bridging group having from one to sixteen carbon atoms and being chosen from linear alkyl, branched alkyl, cyclic, aromatic and heterocyclic (functional groups), and mixtures thereof;

X is chosen from $-SO_3M$, $-PO_3M_2$,

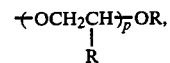

$-OR$ functional groups, and mixtures thereof;

R is individually chosen at each occurrence from H and lower alkyl ($C_1$-$C_4$) groups;

and wherein a, b, and d are integers with the following relationships;

a/b is from zero to 100 b/d is from 0.01 to 100 a/d is from zero to 100, and the sum of a+b+d is sufficient to provide a molecular weight of at least 3,000, and the ratio of d:(a+b) is from 20:1 to 1:100;

and wherein p ranges between 1 and 16, and m ranges between 0 and 16, and n ranges between 1 and 16, provided that, the sum of m+n is from 1 to 20;

which process comprises reacting, in a common solvent, at a temperature of at least 100° C.:

A. a polymer having a molecular weight of at least 500, and having pendant amide functional groups, and represented by the structure:

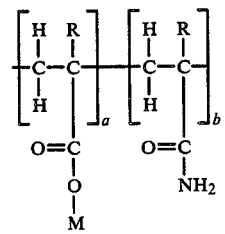

wherein R, M, a, b have the same meanings as above; with

B. a chemical reactant having the structure:

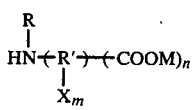

wherein R, R', M, X, m, and n have the meanings above; and wherein the mole ratio of chemical reactant to pendant amide group ranges between about 5:1 to about 1:100; and wherein the reaction occurs for an effective amount of time within a pH range of 2–9 in an aqueous solvent to accomplish at least a 50 percent conversion of chemical reactant to water-soluble carboxylated polymer; and then recovering the water-soluble carboxylated polymer.

Most preferably, my process is a method for the synthesis of water-soluble carboxylated polymers represented by the formula:

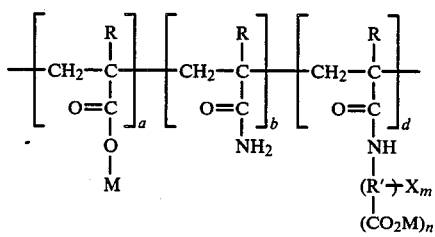

wherein
M is individually chosen at each occurrence from hydrogen, alkali metals, and ammonium ions,
R' is chosen from multi-covalent, branched alkyl, linear alkyl or cyclic hydrocarbonaceous bridging groups having from one to eight carbon atoms;
X is chosen from $-SO_3M$, $OH$, $-OCH_2CH_2)_pOR$, and mixtures thereof;
p ranges between 1 to 12;
m ranges between 0 to 6;
n ranges between 1 to 4;
R is individually chosen at each occurrence from hydrogen and $C_1$ to $C_4$ lower alkyl groups;
a, b, and d are integers with the following relationships:
a/b ranges from 0 to 100,
a/d ranges from 0 to 100,
b/d ranges from 0.01 to 100, and
the ratio d:(a+b) is between about 5:1 to about 1:25, and
wherein the occurrence of mer units of a, b, and d is random and the sum of a+b+d will achieve a molecular weight of at least 1000; which process comprises reacting, in an aqueous solvent:

A. a polymer having pendant amide functional groups and represented by the structure:

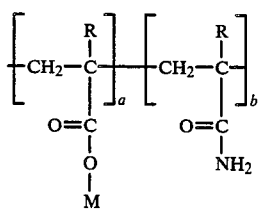

wherein R, M, a, and b have the meanings above and wherein the sum of a+b achieves a molecular weight of at least 500; and B. a chemical reactant having the structure:

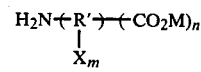

wherein R', M, X, m, and n have the meanings above; under the following reaction conditions:
I. a reaction temperature of at least 100° C. and preferably at least 110° C.;
II. a reaction time of at least ¼ hour and preferably at least ½ hour;
III. a mole ratio of chemical reactant to polymer ranging between about 2:1 to about 1:50;
IV. a pressure ranging from atmospheric pressure to 35 times atmospheric pressure, or more;
thereby achieving the synthesis of the carboxylated polymers described above.

It is particularly of interest that my synthetic procedures permit the synthesis of a carboxylated polymer represented by:

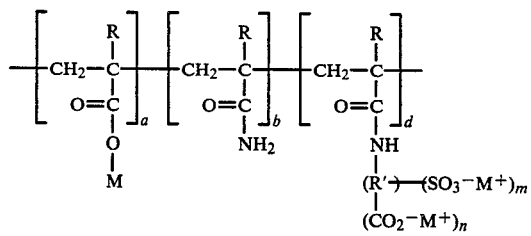

wherein:
R is individually chosen, at each occurrence, from the group hydrogen, methyl and ethyl groups;
M is individually chosen, at each occurrence, from the group hydrogen, sodium, potassium, ammonium ions and mixtures thereof;
R' is linear alkylene bridging group having from 1 to 4 carbon atoms;
m is from 0 to 3;
n is from 1 to 3; and
a, b, and d are integers having the relationships:
a/d is from 0 to 50,
a/b is from 0 to 50,
b/d is from 0.1 to 20,
d:(a+b) is from 5:1 to 1:10,
the sum of a+b+d is sufficient to provide a molecular weight of at least 3,000; which process comprises the reaction, in an aqueous solvent, for at least ¼ hour at a temperature of at least 110° C., in a pressure controlling reactor, of the ingredients:
A. a reactant:

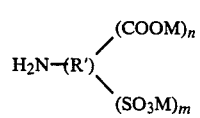

wherein R', M, m and n have the above meanings; and
B. a water-soluble vinyl polymer having pendant amide groups represented by:

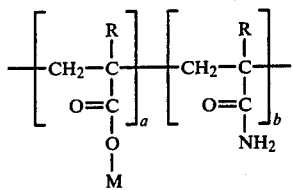

wherein R, M, a, and b have the above meanings; and wherein the mole ratio of reactant to pendant amide groups ranges between about 1:1 to about 1:5; and then recovering the carboxylated polymer.

To further illustrate my invention, I provide the following examples. An appropriate procedure would be:

The compositions of the starting polymers vary from homopolyacrylamide to 50 mole percent acrylamide and acrylic acid copolymers. Terpolymer may be used to well as long as acrylamide or its homologs are incorporated therein. The polymers and reactants were charged as aqueous solutions or dispersions to a Parr Bomb equipped with temperature and pressure measuring devices and also equipped with means to agitate the contents. Temperatures were increased to at least 100° C. in each case. Reaction times ranged from about 20 minutes to in excess of 4 hours to accomplish the synthesis of the polymers which are described in Table I.

TABLE I

MODIFICATION OF AMIDE-CONTAINING POLYMERS IN WATER

| Polymer | Amine (Mole % Changed) | Reaction Temperature | Reaction Time | Recovered Polymer |
|---|---|---|---|---|
| 70 mole % Acrylic Acid/ 30 mole % Acrylamide | Glycine (25) | 150° C. | 4 Hours | 85 mole % acrylic acid/ 5 mole % acrylamide/ 10 mole % carboxymethyl-acrylamide |
| 25 mole % Acrylic Acid/ 75 mole % Acrylamide | Aminocaproic Acid (20) | 150° C. | 5 Hours | 50 mole % acrylic acid/ 35 mole % acrylamide/ 15 mole % carboxypentyl-acrylamide |
| 25 mole % Acrylic Acid/ 75 mole % Acrylamide | Aspartic Acid (20) | 150° C. | 4 Hours | Acrylic acid/acrylamide/ 12 mole % N—(1,2-dicarboxy) ethyl-acrylamide |
| 25 mole % Acrylic Acid/ 75 mole % Acrylamide | 1-Amino-1-Cyclohexane Carboxylic Acid (20) | 150° C. | 3 Hours | Acrylic acid/acrylamide/ 15 mole % carboxycyclo-hexylacrylamide |
| 25 mole % Acrylic Acid/ 75 mole % Acrylamide | 4-Aminobenzoic Acid (20) | 150° C. | 2 Hours | Acrylic acid/acrylamide/ 3 mole % carboxyphenyl-acrylamide |

In addition, the following polymers would be expected to be synthesized if acrylamide containing polymers were reacted according to the procedures described above with the following chemical reactants, which are described with the anticipated products in Table II.

TABLE II

| Starting Polymer | Starting Chemical Reactant | Anticipated Product Polymer |
|---|---|---|
| $[AA]_a$—$[AcAm]_b$ | ![morpholine derivative with CH2SO3H and CH2CO2H groups] | $[AA]_a$—$[AcAm]_b$—$[CH_2—CH]_d$ with $O=C$—$N$ morpholine with $HO_3SCH_2$ and $CH_2CO_2H$ |
| $[AcAm]_b$ | $H_2N$—(benzene ring with OR)—$CH_2CO_2H$, $R = C_2H_5$ | $[AA]_a$—$[AcAm]_b$—$[CH_2—CH]_d$ with $O=C$—$NH$—(benzene ring with RO)—$CH_2CO_2H$ |

TABLE II-continued

| Starting Polymer | Starting Chemical Reactant | Anticipated Product Polymer |
|---|---|---|
| ─(AcAm)$_b$─ | H$_2$N─CH$_2$─C(CH$_3$)(CH$_2$OR)─CH$_2$CO$_2$H  where R is ─CH$_3$ | [AA]$_a$─(AcAm)$_b$─(CH$_2$─CH)$_d$─C(=O)─NH─CH$_2$─C(CH$_3$)(CH$_2$OR)─CH$_2$─CO$_2$H |
| ─(AcAm)$_b$─ | H$_2$N─CH(CH$_2$CO$_2$Na)─CH$_2$OCH$_2$CH$_2$OH | [AA]$_a$─(AcAm)$_b$─(CH$_2$─CH)$_d$─C(=O)─NH─CH(CH$_2$OCH$_2$CH$_2$OH)─CH$_2$─CO$_2$⁻Na$^+$ |
| ─(AcAm)$_b$─ | H$_2$N─CH$_2$─C$_6$H$_3$(CO$_2$H)(COOCH$_3$) | [AA]$_a$─(AcAm)$_b$─(CH$_2$─CH)$_d$─C(=O)─NH─CH$_2$─C$_6$H$_3$(CO$_2$H)(COOCH$_3$) |
| ─(CH$_2$─CH(O=C─O─CH$_3$))$_x$─(AcAm)$_b$─ | H$_2$N─CH$_2$CHSO$_3$H─CH$_2$─CH(HO$_2$C)(CH$_2$OH) | ─(CH$_2$─CH(O=C─O─CH$_3$))$_x$─[AA]$_a$─(AcAm)$_b$─(CH$_2$─CH)$_d$─C(=O)─NH─CH$_2$─CH(SO$_3$H)─CH$_2$─CH(HOCH$_2$)(HOOC) |
| ─(AcAm)─ | H$_2$N─CH(CO$_2$H)─CO$_2$CH$_3$ | [AA]$_a$─(AcAm)$_b$─(CH$_2$─CH)$_d$─C(=O)─NH─CH(CO$_2$H)─C(=O)─O─CH$_3$ |
| ─(AcAm)$_b$─ | H─N(CH$_2$CH$_2$SO$_3$H)(CH$_2$CH$_2$CO$_2$H) | [AA]$_a$─(AcAm)$_b$─(CH$_2$─CH)$_d$─C(=O)─N(CH$_2$CH$_2$SO$_3$H)(CH$_2$CH$_2$CO$_2$H) |
| ─(AcAm)$_b$─ | H─N(CH$_2$CH(OCH$_3$)CH$_2$SO$_3$H)(CH$_2$CH(OCH$_3$)CH$_2$CO$_2$H) | [AA]$_a$─(AcAm)$_b$─(CH$_2$CH)$_d$─C(=O)─N(CH$_2$CH(OCH$_3$)CH$_2$CO$_2$H)(CH$_2$CH(OCH$_3$)CH$_2$SO$_3$H) |
| ─[AA]$_a$─(AcAm)$_b$─ | H$_2$NCH$_2$─CH(O(CH$_2$CH$_2$O)$_4$H)─CH$_2$CO$_2$H | ─[AA]$_a$─(CH$_2$─CH)$_d$─C(=O)─NH─CH$_2$─CH(O(CH$_2$CH$_2$O)$_4$H)─CH$_2$CO$_2$H |

TABLE II-continued

| Starting Polymer | Starting Chemical Reactant | Anticipated Product Polymer |
|---|---|---|
| [AcAm]$_b$ | H$-$(OCH$_2$CH$_2$)$_2$$-$N$^+$(CH$_3$)$_3$ Cl$^-$ with CH$_2$ branch; H$_2$N$-$CH$_2$CH$-$CH$_2$CO$_2$H | +(AA)$_a$+(CH$_2$—CH)$_b$+(CH$_2$—CH) with O=C—NH$_2$ and O=C—NH—CH$_2$—CH(CH$_2$CO$_2$H)—N$^+$(CH$_3$)$_2$(CH$_2$CH$_2$O)$_2$H Cl$^-$ |
| T+(CH$_2$—CH)$_b$T, O=C—NH$_2$; T = any terminal group | H$_2$N—CH$_2$CHSO$_3^-$Na$^+$, CH$_2$—COOH | +(CH$_2$—CH)$_a$+(CH$_2$—CH)$_b$+(CH$_2$—CH)$_d$ with O=C—O$^+$M$^-$, O=C—NH$_2$, O=C—NH—CH$_2$—CH(SO$_3^-$Na$^+$)—CH$_2$COOH |
| T+(CH$_2$—CH)$_b$T, O=C—NH$_2$; T = any terminal group | H$_2$N—CH$_2$CH CH CHCH$_2$CO$_2$H with OR OR OR | +(AA)$_a$+(AcAm)$_b$+(CH$_2$—CH)$_d$ with O=C—NH—CH$_2$—CH(OR)—CH(OR)—CH(OR)—CH$_2$—CO$_2$H |
| T+(CH$_2$—CH)$_b$T, O=C—NH$_2$; T = any terminal group | H$_2$N—CH$_2$—CH(OCH$_2$CH$_2$OH)—CH$_2$—CH$_2$(CO$_2^-$Na$^+$) | +(AA)$_a$+(AcAm)$_b$+(CH$_2$—CH)$_d$ with C=O—NH—CH$_2$—CH(OCH$_2$CH$_2$OH)—CH$_2$—CH$_2$—CO$_2$Na |
| T+(CH$_2$—CH)$_b$T, O=C—NH$_2$; T = any terminal group | cyclohexane with (CH$_3$)$_2$N, H$_2$N, CO$_2$H, OCH$_2$CH$_2$OCH$_2$CH$_2$OH substituents | +(AA)$_a$+(AcAm)$_b$+(CH$_2$—CH)$_d$ with O=C—NH—cyclohexane bearing N(CH$_3$)$_2$, (OCH$_2$CH$_2$)$_2$OH, CO$_2$H |
| +(AA)$_a$ +(AcAm)$_b$ | HN(CH$_3$)—CH$_2$CH(OR)—CH(COOH)—CH$_2$—SO$_3$H | +(AA)$_a$+(AcAm)$_b$+(CH$_2$—CH)$_d$ with O=COH, O=C—N(CH$_3$), and CH$_2$CH(SO$_3$H)—CH(OH)—CH$_2$ | wherein

[AA] = acrylic acid

[AcAm] = acrylamide a, b, d, R, M, have meanings as described above.

Having described my invention, I claim:

1. A process to synthesize water-soluble carboxylated polymers having randomly repeated mer units represented by the formula:

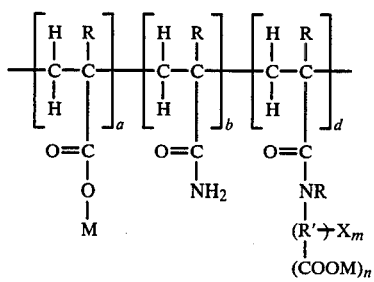

wherein
- M is chosen from hydrogen, lower alkyl ($C_1$-$C_4$) groups, alkali metal, alkaline earth metal, primary, secondary or tertiary amine salts, quaternary amines and ammonium ion, and mixtures thereof;
- R' is a multi-covalent hydrocarbonaceous bridging group having from one to sixteen carbon atoms and being chosen from linear alkyl, branched alkyl, cyclic, aromatic, aralkyl, alkaryl, heterocyclic and olefinic groups;
- X is chosen from —$SO_3M$— $PO_3M_2$, —COOR, —OR, —R'NR''$_2$, —R'N$^+$R$_3$Hal

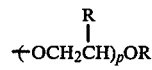

wherein
R'' is

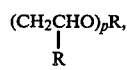

R and mixtures thereof, and
R is individually chosen, at each occurrence, from H and lower alkyl ($C_1$-$C_4$) groups;
and wherein
- a, b, and d are integers with the following relationships;
  - a/b is from zero to 100
  - b/d is from 0.01 to 100
  - a/d is from zero to 100,
  - and the sum of a+b+d is sufficient to provide a molecular weight of at least 1000,
  - and the ratio of d:(a+b) is from 20:1 to 1:100;
and wherein
- p ranges between 1 and 16, and
- m ranges between 0 and 16, and
- n ranges between 1 and 16, provided that when m is zero, the sum of m+n is from 1 to 20;
which process comprises reacting, in a common solvent, at a temperature of at least 100° C.;
A. a polymer having a molecular weight of at least 500, and having pendant amide functional groups, and represented by the structure:

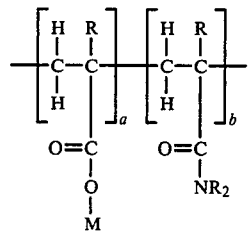

wherein R, M, a, b have the same meanings as above; with
B. a chemical reactant having the structure:

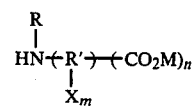

wherein R, R', M, X, m, and n have the meanings above; wherein the mole ratio of chemical reactant to pendant amide groups in the polymer ranges between about 5:1 to about 1:100; and reacting for an effective amount of time to accomplish at least a 2 percent conversion of chemical reactant to carboxylated pendant groups on the polymer; and then recovering the water-soluble carboxylated polymer.

2. The process of claim 1 wherein:
- R is individually chosen at each occurrence from hydrogen, methyl, and ethyl groups,
- M is individually chosen at each occurrence from hydrogen, sodium, potassium, tertiary amines, quaternary ammonium and ammonium ions and mixtures thereof,
- R' has from 1-8 carbon atoms and is linear or branched aliphatic, cyclic, aromatic and mixtures thereof;
- X is —$SO_3M$, OH, ($OCH_2CH_2$)$_p$OH; and mixtures thereof
- p is from 1 to 12
- m is from 0 to 4;
- n is from 1 to 4;
and the molecular weight of the water-soluble carboxylated polymer ranges between about 2000 to about 20,000,000.

3. The process of claim 1 or 2 wherein the common solvent is chosen from the group consisting of water, dimethylformamide, dimethylsulfoxide, diglyme and mixtures thereof.

4. The process of claim 1 or 2 wherein the common solvent is water-emulsified in a continuous oil phase such that the water-soluble carboxylated polymer is recovered as a water-in-oil emulsion.

5. The synthesis of water-soluble carboxylated polymers represented by the formula:

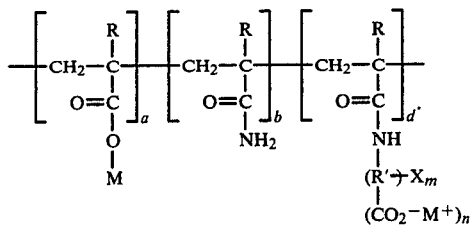

wherein
R is individually chosen at each occurrence from hydrogen and $C_1$ to $C_4$ lower alkyl,
M is individually chosen at each occurrence from hydrogen, alkali metals, tertiary amine salts, and quaternary ammonium and ammonium ions, and mixtures thereof;
R' is chosen from multi-covalent, branched alkyl, linear alkyl, alkaryl, aryl or cyclic hydrocarbonaceous bridging groups having from one to eight carbon atoms;
X is chosen from $-SO_3H$, OH,

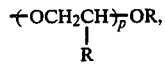

and mixtures thereof;
p ranges from 1 to 12
m ranges between 0 to 6;
n ranges between 1 to 4;
a, b, and d are integers with the following relationships:
a/b ranges from 0 to 100,
a/d ranges from 0 to 100,
b/d ranges from 0.01 to 100, and
the ratio d:(a+b) is between about 5:1 to about 1:25, and
wherein the occurrence of mer units of a, b, and d is random and the sum of a+b+d will achieve a molecular weight of at least 1,000; which process comprises reacting, in an aqueous solvent:
A. a polymer having pendant amide functional groups and represented by the structure:

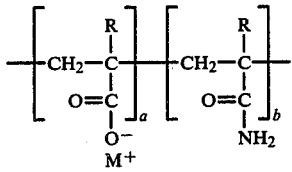

wherein R, M, a, and b have the meanings above and wherein the sum of a+b achieves a molecular weight of at least 500; and
B. a reactant having the structure:

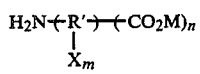

wherein R', M, X, m, and n have the meanings above; under the following reaction conditions:
I. a reaction temperature of at least 100° C.;
II. a reaction time of at least ¼ hour;
III. a mole ratio of chemical reactant to polymer ranging between about 2:1 to about 1:50;
IV. a pressure ranging from atmospheric pressure to 35 times atmospheric pressure;
thereby achieving and thereafter recovering said carboxylated polymers.

6. The process of claim 5,
wherein
R is individually chosen at each occurrence from hydrogen or methyl
M is individually chosen at each occurrence from hydrogen, sodium, potassium, ammonium and mixtures thereof,
R' is a linear or branched alkylene bridging group having from 2 to 6 carbon atoms;
X is $-SO_3M$,

and mixtures thereof, when p is from 1-8;
a, b and d are integers having the following relationships;
a/b ranges from 0 to 50,
a/d ranges from 0 to 50,
b/d ranges from 0.01 to 10, and
d:(a+b) ranges between about 4:1 and 1:20,
and the sum of a+b+d is such that the carboxylated polymer has a molecular weight ranging from 2,000–20,000,000, and which process comprises reacting at a temperature of at least 110° C. for at least ½ hour, in a common aqueous solvent,
A. a polymer having the structure:

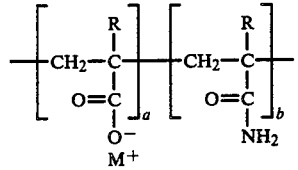

wherein R, M, a, and b have the meanings above and wherein the sum of a+b is such that the molecular weight of the polymer is at least 2,000; with
B. a chemical reactant having the structure:

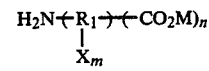

wherein
$R_1$, M, and X are defined above, and
m is from 0 to 3,
n is from 1 to 3, and the sum of m+n is from 1 to 4; and, the ratio of reactant to polymer ranges between about 1:1 to about 1:10, and the reaction pressure is at least 1.25 atmospheres; and then recovering said carboxylated polymer.

7. The process of claim 5 or 6 wherein the aqueous solvent is from the group consisting of water and a water-in-oil emulsion.

8. A process for synthesizing a carboxylated polymer represented by:

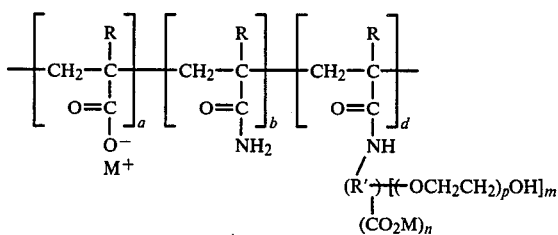

wherein:
R is individually chosen, at each occurrence, from the group hydrogen, methyl and ethyl groups;
M is individually chosen, at each occurrence, from the group hydrogen, sodium, potassium, tertiary amine salts, and ammonium ions and mixtures thereof;
R' is a linear or branched alkylene bridging group having from 1 to 6 carbon atoms;
p is from 1 to 12;
m is from 1 to 6;
n is from 1 to 6; and the sum, n+m, is from 1–10;
a, b, and d are integers having the relationships:
a/d is from 0 to 50,
a/b is from 0 to 50,
b/d is from 0.1 to 20,
d:(a+b) is from 5:1 to 1:10,
the sum of a+b+d is sufficient to provide a molecular weight of at least 2,000; which process comprises reacting in an aqueous solvent, at a pH between about 3–8, for at least ¼ hour at a temperature of at least 110° C., in a pressure controlling reactor, the ingredients:

A. a chemical reactant:

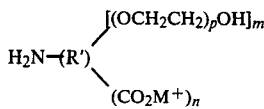

wherein R', M, p, m and n have the above meanings; and

B. a water-soluble vinyl polymer having pendant amide groups represented by:

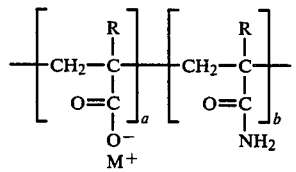

wherein R, M, a, and b have the above meanings; and wherein the mole ratio of reactant to pendant amide groups on the polymer ranges between about 1:1 to about 1:5; and then recovering the carboxylated polymer.

* * * * *